United States Patent
Yu et al.

(10) Patent No.: US 10,795,444 B2
(45) Date of Patent: Oct. 6, 2020

(54) WEARABLE DEVICE, CONTROL METHOD FOR WEARABLE DEVICE AND CONTROL SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zuoxin Yu, Beijing (CN); Jinzhao Zhou, Beijing (CN); Guochun Wang, Beijing (CN); Xinfeng Gong, Beijing (CN); Gang Ci, Beijing (CN); Baolei Guo, Beijing (CN); Zhenhua Luo, Beijing (CN); Wei Su, Beijing (CN); Na An, Beijing (CN); Xuzhong Liu, Beijing (CN); Dianzhong Liu, Beijing (CN); Xiao Ma, Beijing (CN); Bin Xu, Beijing (CN); Shaopeng Xu, Beijing (CN); Qingzhu Guan, Beijing (CN); Zheng Zhang, Beijing (CN); Zongwei Luo, Beijing (CN); Hao Wu, Beijing (CN)

(73) Assignees: BOE TECHNOLOGY GROUP CO., LTD., Beijing (CN); BEIJING BOE OPTOELECTRONICS, Beijing (CN)

( * ) Notice: Subject to any disclaimer, the term of this patent is extended or adjusted under 35 U.S.C. 154(b) by 64 days.

(21) Appl. No.: 16/212,678

(22) Filed: Dec. 6, 2018

(65) Prior Publication Data
US 2019/0361527 A1 Nov. 28, 2019

(30) Foreign Application Priority Data
May 25, 2018 (CN) .......................... 2018 1 0513825

(51) Int. Cl.
*G06F 3/01* (2006.01)
*G06K 9/00* (2006.01)
*A63B 21/00* (2006.01)

(52) U.S. Cl.
CPC .............. *G06F 3/016* (2013.01); *G06F 3/011* (2013.01); *A63B 21/4011* (2015.10); *G06K 9/00624* (2013.01)

(58) Field of Classification Search
CPC ................ A63B 21/00; A63B 21/0056; A63B 21/00076; A63B 21/00192;
(Continued)

(56) References Cited

U.S. PATENT DOCUMENTS 5,980,435 A * 11/1999 Joutras ................. A43B 1/0054
482/114
9,968,817 B2 5/2018 Fields
(Continued)

FOREIGN PATENT DOCUMENTS

CN 201642750 U 11/2010
CN 102065799 A 5/2011
(Continued)

OTHER PUBLICATIONS

First Chinese Office Action dated Sep. 2, 2019, received for corresponding Chinese Application No. 201810513825.1.

*Primary Examiner* — Megan Anderson
(74) *Attorney, Agent, or Firm* — Kinney & Lange, P.A.

(57) ABSTRACT

A wearable device, a control method for the same and a control system are provided. The wearable device is coupled to a terminal device for generating a virtual scene and includes: a device body, a controller and a resistance adjusting mechanism. The controller is coupled to the resistance adjusting mechanism and configured to generate a control signal based on environmental information in the virtual
(Continued)

scene generated by the terminal device. The resistance adjusting mechanism is configured to adjust a resistance parameter of the device body in a working state according to the control signal.

19 Claims, 2 Drawing Sheets

(58) Field of Classification Search
CPC . A63B 21/4011; A63B 24/00; A63B 24/0087; A63B 2071/0638; A63B 71/0622; G06F 3/016; G06F 3/011; G06K 9/00624
See application file for complete search history.

(56) References Cited

U.S. PATENT DOCUMENTS

| | | | | |
|---|---|---|---|---|
| 10,507,351 | B2* | 12/2019 | Krishnan | A63B 21/4047 |
| 10,549,138 | B2* | 2/2020 | Nasiri | A63B 21/00181 |
| 2010/0023133 | A1 | 1/2010 | Fairbanks et al. | |
| 2010/0142416 | A1* | 6/2010 | Kim | H04B 7/15542 370/281 |
| 2015/0173929 | A1 | 6/2015 | Kazerooni et al. | |
| 2016/0374888 | A1 | 12/2016 | Tung et al. | |
| 2018/0093126 | A1 | 4/2018 | von Hoffmann et al. | |
| 2018/0125681 | A1 | 5/2018 | Seifert | |
| 2018/0369053 | A1* | 12/2018 | Lukashevich | A61H 1/0262 |

FOREIGN PATENT DOCUMENTS

| | | |
|---|---|---|
| CN | 103349602 A | 10/2013 |
| CN | 204016771 U | 12/2014 |
| CN | 104822346 A | 8/2015 |
| CN | 204863872 U | 12/2015 |
| CN | 205699105 U | 11/2016 |
| CN | 206152190 U | 5/2017 |
| CN | 107530173 A | 1/2018 |
| CN | 107735067 A | 2/2018 |
| CN | 206991242 U | 2/2018 |
| CN | 107812358 A | 3/2018 |

* cited by examiner

WEARABLE DEVICE, CONTROL METHOD FOR WEARABLE DEVICE AND CONTROL SYSTEM

CROSS-REFERENCE TO RELATED APPLICATION

This application claims a priority to Chinese Patent Application No. 201810513825.1 filed on May 25, 2018, the present disclosure of which is incorporated in its entirety by reference herein.

TECHNICAL FIELD

The present disclosure relates to the field of display, in particular to a wearable device, a control method for the wearable device and a control system.

BACKGROUND

Virtual Reality (abbreviated as VR) technology is a computer simulation technology that can create and experience a virtual world. In VR technology, a virtual scene with a three-dimensional dynamic view is generated using a computer to provide users with simulations on senses such as a visual sense, an auditory sense, a tactile sense, to make the users immersed in the virtual scene.

Based on the VR technology, various VR devices are widely manufactured. For example, the VR technology is used to manufacture a footstep-following omnidirectional treadmill. When using the footstep-following omnidirectional treadmill, the users may experience a virtual scene of moving with infinite distances in various directions in planes, while the users only need to move in a small area in the real world.

However, with the footstep-following omnidirectional treadmill in the related art, walking in different road conditions such as muddy roads and sloped roads cannot be simulated, resulting in a poor walking experience for the users.

SUMMARY

In a first aspect, a wearable device is provided according to some embodiments of the present disclosure. The wearable device is coupled to a terminal device for generating a virtual scene and includes: a device body, a controller and a resistance adjusting mechanism. The controller is coupled to the resistance adjusting mechanism and configured to generate a control signal based on environmental information in the virtual scene generated by the terminal device. The resistance adjusting mechanism is configured to adjust a resistance parameter of the device body in a working state according to the control signal.

In some optional embodiments, the device body includes a first connecting member, a second connecting member and a first connecting structure, the first connecting member and the second connecting member are connected via the first connecting structure, the first connecting member is rotated relative to the second connecting member via the first connecting structure, and the resistance adjusting mechanism is arranged on the first connecting structure. The resistance adjusting mechanism is configured to adjust the resistance parameter for the device body in the working state by adjusting a frictional force between the first connecting member and the second connecting member.

In some optional embodiments, the wearable device further includes: a detection mechanism coupled to the controller, and the detection mechanism is configured to detect a current operating state of the device body and send the current operating state to the controller or the terminal device.

In some optional embodiments, the controller is further configured to determine whether the current operating state of the device body is the working state or a non-working state, and in a case that the device body is in the working state, determine a target resistance parameter matched with the environmental information in the virtual scene and send the control signal including the target resistance parameter to the resistance adjusting mechanism In some optional embodiments, a sliding chute is arranged on the second connecting member, the first connecting member is connected with a sliding bar, one end of the sliding bar is clamped in the sliding chute, and the sliding bar is capable of sliding along the sliding chute. The detection mechanism is configured to trigger the controller to send the control signal to the resistance adjusting mechanism when it is detected that the sliding bar is sliding along the sliding chute.

In some optional embodiments, the detection mechanism includes a sensor, and the sensor is coupled to the controller and arranged at a first position of the sliding chute on the second connecting member. The end of the sliding bar clamped in the sliding chute is provided with a marker. When the sliding bar slides to the first position on the sliding chute, the sensor at the first position is configured to detect the marker and send the current operating state of the device body to the controller, such that the controller determines that the current operating state of the device body is the working state.

In some optional embodiments, the detection mechanism includes a pressure sensor, and the pressure sensor is coupled to the controller, and configured to detect a pressure applied onto the pressure sensor by an object wearing the wearable device, and trigger the controller to send a control signal to the resistance adjusting mechanism in a case that the detected pressure meets a first pressure condition.

In some optional embodiments, the resistance adjusting mechanism includes an electromagnetic damper having two interfaces, and the first connecting member and the second connecting member are connected to the electromagnetic damper through the two interfaces respectively.

In some optional embodiments, the electromagnetic damper is configured to change a first rotational resistance applied onto the first connecting member and a second rotational resistance applied onto the second connecting member to adjust the frictional force between the first connecting member and the second connecting member.

In some optional embodiments, the device body includes a second connecting structure, one end of the second connecting structure is connected to the resistance adjusting mechanism, and another end of the second connecting structure is connected to an object wearing the wearable device. The resistance adjusting mechanism is configured to adjust a force applied onto the second connecting structure according to the control signal.

In some optional embodiments, the environmental information in the virtual scene includes at least one of road condition information and wind speed information, and the road condition information includes at least one of road surface gradient information and road surface roughness information. The controller is further configured to detect the environment information in the virtual scene, or receive a picture of the virtual scene captured by the terminal device and recognize the picture of the virtual scene to obtain the environment information. In some optional embodiments, the resistance parameter includes at least one of a resistance magnitude and a resistance direction.

In a second aspect, a control system is further provided according to some embodiments of the present disclosure, including a terminal device for generating a virtual scene and the above wearable device coupled with each other. The control signal includes a target resistance parameter, and the target resistance parameter is the resistance parameter matched with the environmental information in the virtual scene generated by the terminal device. The resistance adjusting mechanism is configured to adjust the resistance parameter for the device body in the wearable device to be the target resistance parameter according to the control signal.

In some optional embodiments, the terminal device is configured to identify the environmental information in the virtual scene, determine the target resistance parameter matched with the environmental information, and send a control instruction including the target resistance parameter to the controller. The controller is configured to generate the control signal including the target resistance parameter in response to the control instruction.

In some optional embodiments, the environmental information in the virtual scene includes at least one of road condition information and wind speed information, and the road condition information includes at least one of road surface gradient information and road surface roughness information. The terminal device is configured to capture a picture of the virtual scene, and the controller is configured to recognize the picture of the virtual scene to obtain the environment information.

In a third aspect, a control method for a wearable device is further provided according to some embodiments of the present disclosure, which is applied to the wearable device described above, the method includes:

generating a control signal based on the environmental information in the virtual scene generated by the terminal device; and adjusting the resistance parameter of the device body in the working state according to the control signal.

In some optional embodiments, the control method further includes:

detecting a current operating state of the device body, and determining whether the current operating state of the device body is the working state or a non-working state; and determining a target resistance parameter matched with the environmental information in the virtual scene, and adjusting the resistance parameter for the device body in the wearable device to be the target resistance parameter in a case that the device body is in the working state.

DETAILED DESCRIPTION

To make an objective, features and advantages of the present disclosure more apparent and easy to be understood, in the following, the present disclosure is illustrated in detail in conjunction with the drawings and particular embodiments.

In the description of the present disclosure, unless otherwise defined, a word "a/the plurality of" represents the existence of two or more members, orientation or position relationships indicated by such terms as "on/above", "under/below", "left", "right", "inside" and "outside" are the orientation or position relationships as shown in drawings, which are merely used for easily descripting the present disclosure and simplifying the description, but do not indicate or imply that the machine or component must have the specified orientation or be constructed and operated in the specified orientation, and thus are should not be understood to limit the present disclosure.

In the description of the present disclosure, it should be noted that, unless otherwise defined, such terms as "arranging/arranged", "connected/connecting", and "connection" should be understood in a broad sense, for example, may be a fixed connection, a detachable connection, or an integral connection; may be a mechanical connection or an electrical connection; may be a direct connection or may also be an indirect connection via an intermediate medium. The specific meanings of the above terms in the present disclosure can be understood in the specific circumstances by those skilled in the art.

A wearable device is provided according to the present disclosure, so as to solve the problem of a poor walking experience for users using a footstep-following omnidirectional treadmill, which is caused by the situation that walking in different road conditions such as muddy roads and sloped roads cannot be simulated with the footstep-following omnidirectional treadmill in the related art.

Hereinafter, specific implementing manners of the present disclosure are described in detail in conjunction with the drawings and embodiments. The following embodiments are used for illustrating the present disclosure, but not to limit the scope of the present disclosure.

Figure 1:
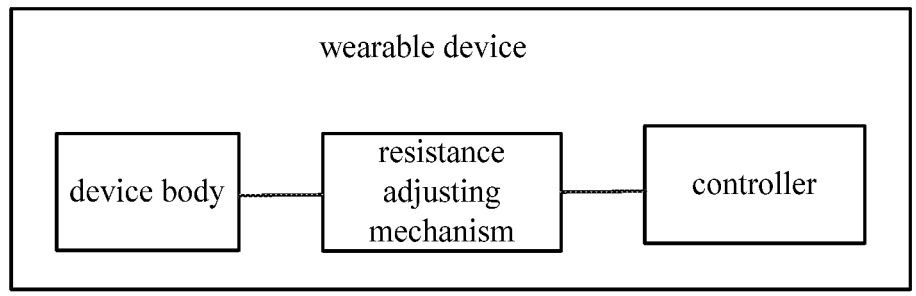
FIG. 1 is a block diagram of a wearable device according to at least one embodiment of the present disclosure.

With reference to FIG. 1, a wearable device is provided according to at least one embodiment of the present disclosure, which is coupled to a terminal device for generating a virtual scene. The wearable device includes a device body, a controller and a resistance adjusting mechanism. The controller is coupled to the resistance adjusting mechanism and configured to generate a control signal based on environmental information in the virtual scene generated by the terminal device. The resistance adjusting mechanism is configured to adjust a resistance parameter of the device body in the working state according to the control signal.

When the object wears the wearable device, the object is connected to the device body in the wearable device. There are many types of objects that may wear the wearable device, such as humans, animals, parts, or devices.

The resistance adjusting mechanism may adjust one or more resistance parameters, for example, adjust a magnitude or a direction of the resistance, or set the type of the resistance parameter to be adjusted according to actual conditions. On the basis of that the resistance adjusting mechanism has the above functions, the specific structure of the resistance adjusting mechanism may be arranged according to actual conditions. For example, the resistance adjusting mechanism may be an electromagnetic damper or the like.

Based on the structural arrangement and functional setting of the controller and the resistance adjusting mechanism, the wearable device has a function of adjusting the resistance parameter of the device body in the working state, enriching the functions of the wearable device.

In practice, when the object wearing the wearable device is moving, a current operating state of the device body is in the working state; and when the object keeps its body unmoved, the current operating state of the device body is in a non-working state. The resistance adjusting mechanism may adjust the resistance encountered by the object when moving by adjusting the resistance parameter of the device body in the working state, thereby controlling the moving state of the object.

Figure 3:
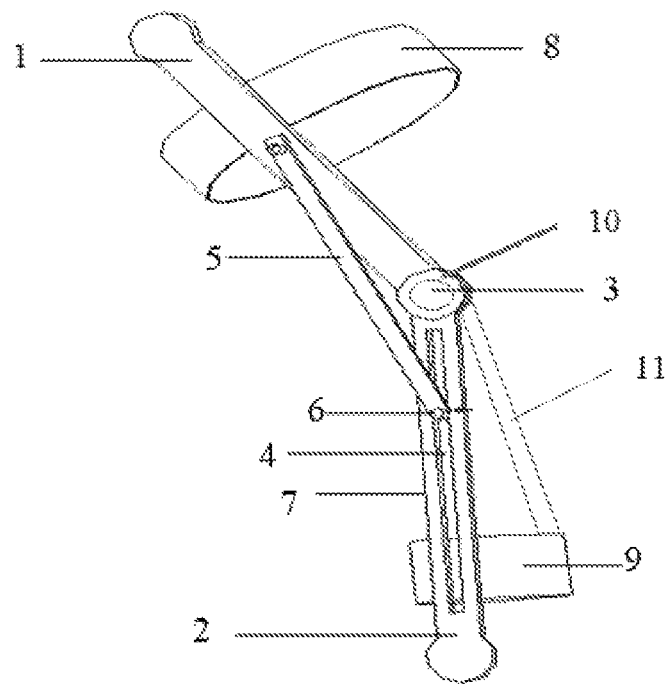
FIG. 3 is a schematic structural diagram of a wearable device according to at least one embodiment of the present disclosure.

The structure of the device body and the adjustment of the device body by the resistance adjusting mechanism may be set according to actual conditions. For example, the device body may include a first connecting member and a second connecting member, the first connecting member and the second connecting member are connected via a first connecting structure 10 as shown in FIG. 3, and the resistance adjusting mechanism 3 is arranged on the first connecting structure 10. In this case, the resistance adjusting mechanism is configured to adjust the resistance parameter of the device body in the working state by adjusting a frictional force between the first connecting member and the second connecting member.

The types of the first connecting structure may be various, such as a rotation shaft, and a hinge. In a case that the first connecting structure is a rotation shaft, the first connecting member and the second connecting member are connected via the rotation shaft, and the resistance adjusting mechanism is configured to adjust a rotational frictional force between the first connecting member and the second connecting member.

Figure 2:
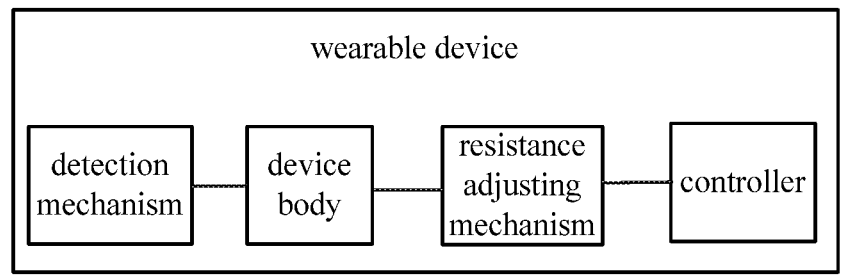
FIG. 2 is a block diagram of a wearable device according to at least one embodiment of the present disclosure.

As shown in FIG. 2, in some optional embodiments, the wearable device further includes a detection mechanism coupled to the controller, and the detection mechanism is configured to detect a current operating state of the device body and send the current operating state to the controller or the terminal device.

The detection mechanism is used to detect the current operating state of the device body, and the type of the operating state to be detected by the detection mechanism may be set according to actual conditions, for example, the detection mechanism is used to detect a bending state of the device body. The preset condition is set according to the working state of the device body, and different working states correspond to different preset conditions. For example, in a case that the working state includes the bending state, the preset condition includes the device body being bent.

The detection mechanism may be a sensor, such as an infrared sensor, a pressure sensor. There are various options for a position where the detection mechanism is arranged. For example, the detection mechanism may be arranged on the device body of the wearable device, or may be arranged at other positions outside the wearable device.

Based on the arrangement of the detection mechanism, the wearable device has a function of detecting the working state of the device body, and the controller is triggered to send a control signal to the resistance adjusting mechanism, in a case that the detection result meets the preset condition, that is, in a case that the device body is in the working state. The resistance adjusting mechanism adjusts resistance parameter of the device body in the working state according to the control signal, thereby adjusting the resistance encountered by the object wearing the wearable device in the moving state. Due to the arrangement of the detection mechanism, the function of the wearable device is enriched.

The wearable device according to the embodiment of the present disclosure may be coupled to the terminal device for generating a virtual scene, and be used in conjunction with the terminal device for generating a virtual scene. There are various terminal devices for generating a virtual scene, such as Virtual Reality (VR) terminal devices. There are various VR terminal devices, such as a VR helmet, or VR glasses.

In a case that the wearable device is coupled to the terminal device for generating a virtual scene, the detection mechanism may be configured to detect the current operating state of the device body and send a detection result to the terminal device. Once receiving the detection result, it is determined by the terminal device whether the detection result meets the preset condition. After it is determined that the detection result meets the preset condition, the environmental information in the virtual scene generated by the terminal device is acquired, a target resistance parameter matched with the environmental information are determined, and a control instruction carrying the target resistance parameter is sent to the wearable device. The controller of the wearable device receives the control instruction sent by the terminal device, and sends the control signal carrying the target resistance parameter to the resistance adjusting mechanism to adjust the resistance parameter of the device body in the working state to be the target resistance parameter.

The environmental information includes various kinds of information content, such as road condition information and wind speed information. The road condition information includes at least one of road surface gradient information and road surface roughness information. The type of the resistance parameter may be various, for example, the resistance parameter may include a magnitude or a direction of the resistance. Generally, a road surface gradient level, a road surface roughness level and a wind speed level each is in proportion to the magnitude of resistance. The corresponding relationships between the environmental information and the resistance parameter may be set according to actual conditions. The resistance parameter of the device body in the working state is adjusted properly, as the environmental information in the virtual scene changes. For example, when the road surface gradient becomes larger, the road surface becomes rougher, or the wind speed is increased in the virtual scene, the magnitude of the resistance sustained by the device body may be increased or the direction of the resistance sustained by the device body may be changed in the real word according to the information in the virtual scene. In such a manner, the user may obtain walking experiences in different virtual scenes, which are close to reality.

In addition to the above-described control process, an operation of determining the target resistance parameter matched with the environmental information in the virtual scene generated by the terminal device may be carried out by the controller of the wearable device. For example, the terminal device for generating the virtual scene may acquire the environmental information in the virtual scene in a real-time manner or at a preset time interval, and send the environmental information in the virtual scene to the wearable device. The controller of the wearable device may determine the target resistance parameter corresponding to the received environmental information according to the preset corresponding relationships between the environmental information and the resistance parameter. Alternatively, the terminal device for generating the virtual scene may send a picture of the virtual scene to the wearable device, and the controller of the wearable device may recognize the corresponding environmental information based on the picture of the virtual scene and then determine target resistance parameter according to the determined environmental information.

The controller may be any hardware having a computing function, for example a computing device or a processor. The relevant functions of the controller may be carried out by relevant hardware instructed by programs. In some optional embodiments, the wearable device further includes a storage, the corresponding relationships between the environmental information in the virtual scene and the resistance parameters are stored in the storage in advance, the controller queries the corresponding target resistance parameter in the storage based on the environmental information in the virtual scene generated by the terminal device, and generates the control signal carrying the target resistance parameter.

The structures of multiple parts such as the device body and the detection mechanism may be set according to actual conditions. As an example, FIG. 3 shows a schematic structural diagram of a wearable device according to at least one embodiment of the present disclosure. As shown in FIG. 3, the wearable device includes a device body, a resistance adjusting mechanism and a controller. The device body includes a first connecting member 1 and a second connecting member 2, the first connecting member 1 and the second connecting member 2 are connected via the rotation shaft, and the resistance adjusting mechanism is arranged on the rotation shaft. The resistance adjusting mechanism is configured to adjust the resistance parameter of the device body in the working state by adjusting a rotational frictional force between the first connecting member 1 and the second connecting member 2. The resistance adjusting mechanism includes an electromagnetic damper 3.

The electromagnetic damper 3 may have two interfaces, the first connecting member 1 may be connected to one interface of the electromagnetic damper 3, and the second connecting member 2 may be connected to the other interface of the electromagnetic damper 3. The first connecting member 1 may be rotated in relation to the second connecting member 2 via the electromagnetic damper 3. The electromagnetic damper 3 may apply rotational resistances onto the first connecting member 1 and the second connecting member 2 to adjust the rotational frictional force between the first connecting member 1 and the second connecting member 2.

As shown in FIG. 3, a sliding chute 4 is arranged on the second connecting member 2, the first connecting member 1 is connected with a sliding bar 5, one end of the sliding bar 5 is clamped in the sliding chute 4, and the other end of the sliding bar 5 is capable of sliding along the sliding chute 4. The detection mechanism is arranged on the second connecting member 2 and close to the sliding chute 4, and the detection mechanism is configured to trigger the controller to send a control signal to the resistance adjusting mechanism when it is detected that the sliding bar 5 is sliding along the sliding chute 4 to the preset position.

The detection mechanism includes an infrared sensor 7, the infrared sensor 7 is arranged at a first position of the sliding chute 4 on the second connecting member 2, and one end of the sliding bar 5 clamped in the sliding chute 4 may be provided with a marker 6. The infrared sensor 7 is configured to detect the marker 6, and send a detection result to the controller after the marker 6 is detected, to trigger the controller to send a control signal to the resistance adjusting mechanism. As shown in FIG. 3, the infrared sensor 7 is arranged on the second connecting member 2 and close to the sliding chute 4.

In some optional embodiments, the marker 6 includes an infrared light source, and the infrared light source emits infrared light in the working state. Upon receipt of the infrared light emitted by the marker 6, the infrared sensor 7 triggers the controller to send a control signal to the resistance adjusting mechanism.

The infrared sensor is taken as an example in the embodiment of the present disclosure, the sensor may also be an ultraviolet sensor or various colors of visible light sensors, as long as the receiving wave range of the sensor corresponds to the luminescence wave range of the light source of the marker.

When the object wearing the wearable device is bent, the first connecting member 1 is rotated in relation to the second connecting member 2, and one end of the sliding bar 5 slides on the sliding chute 4 of the second connecting structure 2. If the marker 6 on the sliding bar 5 passes through the infrared sensor 7, the marker 6 can be detected by the infrared sensor 7, and the infrared sensor 7 triggers the controller to send the control signal to the resistance adjusting mechanism.

The device body shown in FIG. 3 further includes a first fixing member 8 and a second fixing member 9. The first fixing member 8 is fixed to the first connecting member 1, and the second fixing member 9 is fixed to the second connecting member 2. The object may wear the wearable device by wearing the first fixing member 8 and the second fixing member 9. The structures of the fixing members shown in FIG. 3 are just as an example, and the structures of the fixing members may be set according to actual conditions, which is not limited.

In practice, in a case that the object wearing the wearable device is a human, the wearable device shown in FIG. 3 can be worn on a leg of the human body. Specifically, the first fixing member 8 may be fixed on the thigh of the human body, and the second fixing member 9 may be fixed on the lower leg of the human body. In this case, the first connecting member 1 is located at the corresponding position of the thigh, the second connecting member 2 is located at the corresponding position of the lower leg, and the electromagnetic damper 3 is located at a position corresponding to the knee. When the human walks and the leg of the human body is bent, one end of the sliding bar 5 slides in the sliding chute 4. When the marker 6 arranged on the sliding bar 5 is detected by the infrared sensor 7, and the infrared sensor 7 triggers the controller to send the control signal to the resistance adjusting mechanism.

According to statistics, the general length of the lower leg of the human is in a range from 0.33 to 0.37 meters. Optionally, the case that the sliding bar 5 slides along the sliding chute to a position where the second connecting member 2 is 0.08 meters away from the electromagnetic damper may be set as the case that the device body is in the working state, that is, the infrared sensor 7 is arranged at a position on second connecting member 2 which is 0.08 meters away from the electromagnetic damper. It can be understood that the position where the infrared sensor 7 is arranged on the second connecting member 2 may be affected by factors such as the actual height and walking habits of the human body, and can be customized according to actual conditions, which is not limited in the present disclosure.

In the embodiment of the present disclosure, in addition to the infrared sensor 7 shown in FIG. 3, the detection mechanism may further include a pressure sensor which is coupled to the controller. The pressure sensor is configured to detect a pressure applied by the object wearing the wearable device onto the pressure sensor, and trigger the controller to send a control signal to the resistance adjusting mechanism in a case that the detected pressure meets the preset pressure condition.

The pressure sensor may be arranged on the object wearing the wearable device. For example, when the object is a human, the pressure sensor may be arranged on the bottom surface of the foot of the human body. When the detected pressure value reaches the preset pressure value, it is determined that the leg of the human body is bent, and the pressure sensor triggers the controller to send a control signal to the resistance adjusting mechanism. The content defined by the arrangement position and the preset pressure condition of the pressure sensor may be set according to actual conditions.

On the basis of that the device body has the above-described functions, the structure of the device body may be set according to actual conditions. In addition to the structure of the device body shown in FIG. 3, the device body may include a second connecting structure 11, one end of the second connecting structure 11 is connected to the resistance adjusting mechanism 3, and the other end of the second connecting structure 11 is connected to the object wearing the wearable device. The resistance adjusting mechanism 3 is configured to adjust a force parameter applied onto the second connecting structure 11 according to the control signal, thereby adjusting the resistance encountered by the object in the moving state. The types of the second connecting structure are various, such as a connecting thread, and the specific structure of the second connecting structure may be set according to actual conditions.

For example, when the object wearing the wearable device is a human and the second connecting structure is a connecting thread, one end of the connecting thread is connected to the lower leg of the human body, and the other end of connecting thread is connected to the resistance adjusting mechanism fixed on the base surface. The resistance adjusting mechanism may adjust a pulling force applied onto the lower leg of the human body by adjusting a pulling force on the connecting thread, and thus adjust the resistance encountered by the leg of the human body being bent.

The embodiment of the present disclosure is merely as an example of the structure of the wearable device, and any other structure suitable for the present disclosure may be used.

A control system is further provided according to at least one embodiment of the present disclosure, which includes a terminal device for generating a virtual scene and the wearable device according to the embodiment of the present disclosure described above.

The controller in the wearable device is configured to send a control signal to the resistance adjusting mechanism in the wearable device, the control signal carries the target resistance parameter, and the target resistance parameter is the resistance parameter matched with the environmental information in the virtual scene of the terminal device. The resistance adjusting mechanism is configured to adjust the resistance parameter for the device body in the wearable device to be the target resistance parameter according to the control signal.

The environmental information may include many kinds of information contents, such as road condition information and wind speed information. The road condition information includes at least one of road surface gradient information and road surface roughness information. Generally, a road surface gradient level, a road surface roughness level and a wind speed level each are in proportion to a magnitude of the target resistance. The corresponding relationship between the environmental information and the target resistance may be set according to actual conditions.

There are various terminal devices for generating a virtual scene, such as Virtual Reality (VR) terminal devices. There are various VR terminal devices, such as a VR helmet, or VR glasses. The user may be immersed in a stereoscopic virtual scene by wearing such terminal device.

In the control system according to the embodiment of the present disclosure, the wearable device is used in conjunction with the terminal device for generating a virtual scene. The resistance adjusting mechanism of the wearable device may be controlled based on the environmental information in the virtual scene generated by the terminal device, thereby adjusting the resistance parameter of the device body in the working state, and adjusting the resistance encountered by the object wearing the wearable device in the moving state. Hence, the object can obtain a realistic moving experience in the virtual scene, and can be immersed in the virtual scene more realistically, improving the activity experience of the object in the virtual scene.

In a case that the target resistance parameter is determined by the terminal device for generating the virtual scene, the terminal device is configured to identify the environmental information in the virtual scene, determine the target resistance parameter matched with the environmental information, and send a control instruction carrying the target resistance parameter to the controller. In this case, the controller is configured to generate the control signal carrying the target resistance parameter in response to the control instruction.

Further, the wearable device may include a detection mechanism coupled to the controller. The detection mechanism is configured to detect the current operating state of the device body and send the detection result to the terminal device via the controller, that is, the detection mechanism sends the detection result to the controller and the controller sends the detection result to the terminal device. In this case, the terminal device is configured to determine whether the detection result meets a preset condition, and then start to identify the environmental information in the virtual scene in a case that the detection result meets the preset condition.

The detection result of the detection mechanism on the current operating state of the device body is used as a basis for the terminal device identifying the environmental information in the virtual scene. In a case that the detection result meets the preset condition, the terminal device is triggered to start to identify the environmental information in the virtual scene.

The types of the detection mechanism may be various, such as an infrared sensor, a pressure sensor. In a case that the detection mechanism is the infrared sensor, the infrared sensor may be configured to send an infrared signal to the controller after the marker is detected, and the infrared signal is sent by the controller to the terminal device. The terminal device starts to identify the environmental information in the virtual scene after receiving the infrared signal.

In a case that the detection mechanism is the pressure sensor, the pressure sensor may be configured to detect a pressure applied by the object wearing the wearable device onto the pressure sensor, and send the detected pressure to the controller, and the pressure is sent by the controller to the terminal device. After it is determined that the pressure meets a preset pressure condition, for example, it is determined that the value of the pressure is larger than a pressure threshold, the terminal device starts to identify the environmental information in the virtual scene.

Alternatively, the detection mechanism detects the current operating state of the device body, and sends the detection result to the controller inside the wearable device. The detection result is determined by the controller. In a case that the detection result meets the preset condition, the controller sends a specified instruction to the terminal device for generating a virtual scene, and the terminal device starts to identify the environmental information in the virtual scene once receiving the specified instruction.

The specific operation process in the control system may be set according to actual conditions.

Figure 4:
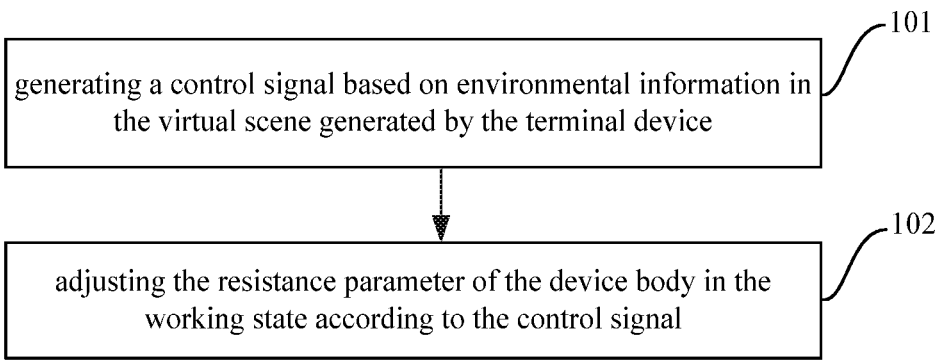
FIG. 4 is a flowchart of a control method for a wearable device according to at least one embodiment of the present disclosure.

A control method for a wearable device is further provided according to at least one embodiment of the present disclosure, which is applied to the wearable device according to the above-described embodiments of the present disclosure. The wearable device is coupled to the terminal device for generating a virtual scene. As shown in FIG. 4, the control method for a wearable device according to the embodiment of the present disclosure includes step 101 and 102.

Step 101, generating a control signal based on environmental information in the virtual scene generated by the terminal device.

Step 102, adjusting the resistance parameter of the device body in the working state according to the control signal.

With the above-described method, the wearable device according to the embodiments of the present disclosure is controlled, the resistance parameter of the device body in the working state is adjusted, and the resistance encountered by the object wearing the wearable device in the moving state is adjusted.

Figure 5:
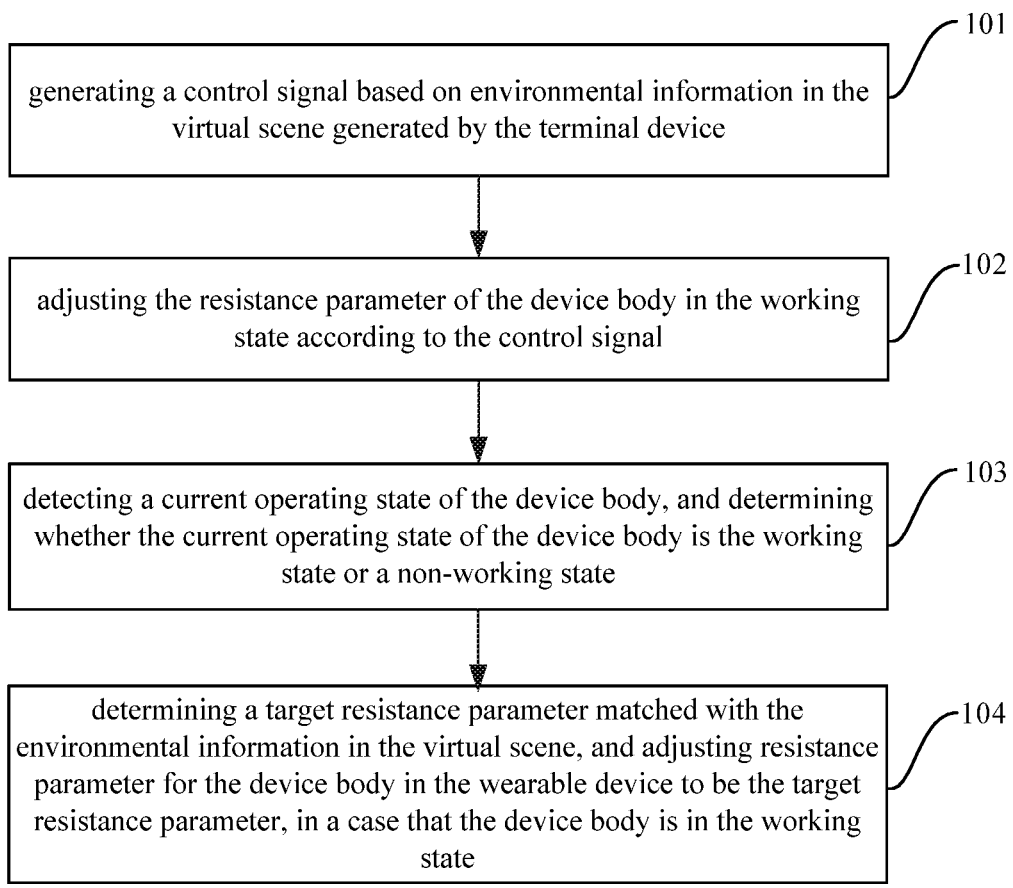
FIG. 5 is a flowchart of a control method for a wearable device according to at least one embodiment of the present disclosure.

In some optional embodiments, as shown in FIG. 5, the control method further includes step 103 and 104.

Step 103, detecting a current operating state of the device body, and determining whether the current operating state of the device body is the working state or a non-working state.

Step 104, determining a target resistance parameter matched with the environmental information in the virtual scene, and adjusting resistance parameter for the device body in the wearable device to be the target resistance parameter, in a case that the device body is in the working state.

A wearable device, a control system, and a control method for the wearable device are provided according to the optional embodiments of the present disclosure. The wearable device according to the optional embodiments of the present disclosure includes: a device body, a controller and a resistance adjusting mechanism. Based on the structural arrangement and function setting of the controller and the resistance adjusting mechanism, the wearable device has a function of adjusting the resistance parameter of the device body in the working state, enriching the functions of the wearable device.

The embodiments of the present disclosure are described in a progressive manner, and each embodiment places emphasis on the difference from other embodiments. Therefore, one embodiment can refer to other embodiments for the same or similar parts.

It should be noted that the units included in the above-described device embodiments are divided according to the logical functions, but the present disclosure is not limited to the division manner described above, as long as the related functions can be achieved. Additionally, the specific names of the functional units are used only for ease of distinction with each other, but not intended to limit the scope of the present disclosure.

Additionally, those skilled in the art may understand that, all or part of the steps achieving the above embodiments may be carried out by relevant hardware instructed by related programs, which may be stored in a computer readable storage medium. The aforementioned storage medium may include a read-only memory, a magnetic disk or an optical disk.

The above embodiments are only the optional embodiments of the present disclosure, but the protection scope of the present disclosure is not limited to these embodiments. Various changes and substitutions made by those skilled in the art within the principle disclosed in the present disclosure shall be fall within the protection scope of the present disclosure.

What is claimed is:

1. A wearable device, coupled to a terminal device for generating a virtual scene, the wearable device comprising:
   a device body;
   a controller;
   a resistance adjusting mechanism; and
   a detection mechanism coupled to the controller, wherein the detection mechanism is configured to detect a current operating state of the device body and send the current operating state to the controller or the terminal device,
   wherein the controller is coupled to the resistance adjusting mechanism and configured to generate a control signal based on environmental information in the virtual scene generated by the terminal device;
   wherein the resistance adjusting mechanism is configured to adjust a resistance parameter of the device body in a working state according to the control signal;
   wherein the device body comprises a first connecting member, a second connecting member and a first connecting structure;
   wherein the first connecting member and the second connecting member are connected via the first connecting structure;
   wherein the first connecting member is rotated relative to the second connecting member via the first connecting structure, and the resistance adjusting mechanism is arranged on the first connecting structure;
   wherein the resistance adjusting mechanism is configured to adjust the resistance parameter for the device body in the working state by adjusting a frictional force between the first connecting member and the second connecting member; and
   wherein a sliding chute is arranged on the second connecting member, the first connecting member is connected with a sliding bar, one end of the sliding bar is clamped in the sliding chute, the sliding bar is capable of sliding along the sliding chute, and the detection mechanism is configured to trigger the controller to send the control signal to the resistance adjusting mechanism when it is detected that the sliding bar is sliding along the sliding chute.

2. The wearable device according to claim 1, wherein the resistance adjusting mechanism comprises an electromagnetic damper, and the first connecting member and the second connecting member are connected to the electromagnetic damper respectively.

3. The wearable device according to claim 2, wherein the electromagnetic damper is configured to change a first rotational resistance applied onto the first connecting member and a second rotational resistance applied onto the second connecting member to adjust the frictional force between the first connecting member and the second connecting member.

4. The wearable device according to claim 1, wherein the controller is further configured to determine whether the current operating state of the device body is the working state or a non-working state, and in a case that the device body is in the working state, determine a target resistance parameter matched with the environmental information in the virtual scene and send the control signal comprising the target resistance parameter to the resistance adjusting mechanism.

5. The wearable device according to claim 1, wherein:
the detection mechanism comprises a sensor, and the sensor is coupled to the controller and arranged at a first position of the sliding chute on the second connecting member;
the end of the sliding bar clamped in the sliding chute is provided with a marker; and
when the sliding bar slides to the first position on the sliding chute, the sensor at the first position is configured to detect the marker and send the current operating state of the device body to the controller, such that the controller determines that the current operating state of the device body is the working state.

6. The wearable device according to claim 1, wherein one end of the second connecting structure is connected to the resistance adjusting mechanism, and another end of the second connecting structure is configured to be connected to an object; and
the resistance adjusting mechanism is configured to adjust a force applied onto the second connecting structure according to the control signal.

7. The wearable device according to claim 1, wherein the environmental information in the virtual scene comprises at least one of road condition information and wind speed information, and the road condition information comprises at least one of road surface gradient information and road surface roughness information; and
wherein the controller is further configured to detect the environment information in the virtual scene, or receive a picture of the virtual scene captured by the terminal device and recognize the picture of the virtual scene to obtain the environment information.

8. The wearable device according to claim 1, wherein the resistance parameter comprises at least one of a resistance magnitude and a resistance direction.

9. A control system, comprising the terminal device for generating the virtual scene and the wearable device according to claim 1,
wherein the control signal comprises a target resistance parameter, and the target resistance parameter is the resistance parameter matched with the environmental information in the virtual scene generated by the terminal device; and
the resistance adjusting mechanism is configured to adjust the resistance parameter for the device body in the wearable device to be the target resistance parameter according to the control signal.

10. The control system according to claim 9, wherein the terminal device is configured to identify the environmental information in the virtual scene, determine the target resistance parameter matched with the environmental information, and send a control instruction comprising the target resistance parameter to the controller; and
the controller is configured to generate the control signal comprising the target resistance parameter in response to the control instruction.

11. The control system according to claim 9, wherein the environmental information in the virtual scene comprises at least one of road condition information and wind speed information, the road condition information comprising at least one of road surface gradient information and road surface roughness information, and
wherein the terminal device is configured to capture a picture of the virtual scene, and the controller is configured to recognize the picture of the virtual scene to obtain the environment information.

12. The control system according to claim 9, wherein:
the controller is further configured to determine whether the current operating state of the device body is the working state or a non-working state, and in a case that the device body is in the working state, determine the target resistance parameter matched with the environmental information in the virtual scene and send the control signal comprising the target resistance parameter to the resistance adjusting mechanism.

13. The control system according to claim 9, wherein:
the detection mechanism comprises a sensor, and the sensor is coupled to the controller and arranged at a first position on the sliding chute on the second connecting member;
the end of the sliding bar clamped in the sliding chute is provided with a marker; and
when the sliding bar slides to the first position on the sliding chute, the sensor at the first position is configured to detect the marker and send the current operating state of the device body to the controller, such that the controller determines that the current operating state of the device body is the working state.

14. A control method for controlling the wearable device according to claim 1, wherein the method comprises:
generating the control signal based on the environmental information in the virtual scene generated by the terminal device; and
adjusting the resistance parameter of the device body in a working state according to the control signal.

15. The control method according to claim 14, further comprising:
detecting the current operating state of the device body, and determining whether the current operating state of the device body is the working state or a non-working state; and
determining a target resistance parameter matched with the environmental information in the virtual scene, and adjusting the resistance parameter for the device body in the wearable device to be the target resistance parameter in a case that the device body is in the working state.

16. A wearable device, coupled to a terminal device for generating a virtual scene, the wearable device comprising:
a device body;
a controller; and
a resistance adjusting mechanism, wherein the controller is coupled to the resistance adjusting mechanism and configured to generate a control signal based on environmental information in the virtual scene generated by the terminal device;

wherein the resistance adjusting mechanism is configured to adjust a resistance parameter of the device body in a working state according to the control signal;

wherein the environmental information in the virtual scene comprises at least one of road condition information and wind speed information, and the road condition information comprises at least one of road surface gradient information and road surface roughness information; and wherein the controller is further configured to detect the environment information in the virtual scene, or receive a picture of the virtual scene captured by the terminal device and recognize the picture of the virtual scene to obtain the environment information.

17. The wearable device according to claim 16, wherein:

the device body comprises a first connecting member, a second connecting member and a first connecting structure;

the first connecting member and the second connecting member are connected via the first connecting structure;

the first connecting member is rotated relative to the second connecting member via the first connecting structure, and the resistance adjusting mechanism is arranged on the first connecting structure; and the resistance adjusting mechanism is configured to adjust the resistance parameter for the device body in the working state by adjusting a frictional force between the first connecting member and the second connecting member.

18. The wearable device according to claim 17, further comprising:

a detection mechanism coupled to the controller, wherein the detection mechanism is configured to detect a current operating state of the device body and send the current operating state to the controller or the terminal device.

19. The wearable device according to claim 18, wherein:

a sliding chute is arranged on the second connecting member;

the first connecting member is connected with a sliding bar;

one end of the sliding bar is clamped in the sliding chute;

the sliding bar is capable of sliding along the sliding chute; and the detection mechanism is configured to trigger the controller to send the control signal to the resistance adjusting mechanism when it is detected that the sliding bar is sliding along the sliding chute.

\* \* \* \* \*

UNITED STATES PATENT AND TRADEMARK OFFICE
CERTIFICATE OF CORRECTION

| | |
|---|---|
| PATENT NO. | : 10,795,444 B2 |
| APPLICATION NO. | : 16/212678 |
| DATED | : October 6, 2020 |
| INVENTOR(S) | : Zuoxin Yu et al. |

Page 1 of 1

It is certified that error appears in the above-identified patent and that said Letters Patent is hereby corrected as shown below:

On the Title Page

Item (73) Assignees:
Delete "BEIJING BOE OPTOELECTRONICS, Beijing (CN)"
Insert -- BEIJING BOE OPTOELECTRONICS TECHNOLOGY CO., LTD., Beijing (CN)" --

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*